United States Patent
Zimmermann

(10) Patent No.: US 7,585,469 B2
(45) Date of Patent: Sep. 8, 2009

(54) SPECIMEN HOLDER FOR MICROSCOPIC EXAMINATIONS

(75) Inventor: Heinz Zimmermann, Balgach (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 488 days.

(21) Appl. No.: 11/364,039

(22) Filed: Feb. 28, 2006

(65) Prior Publication Data

US 2006/0198764 A1    Sep. 7, 2006

(30) Foreign Application Priority Data

Mar. 3, 2005   (DE) .................. 10 2005 009 756

(51) Int. Cl.
*B01L 3/00* (2006.01)
*G02B 3/00* (2006.01)

(52) U.S. Cl. ............. 422/102; 422/104; 359/368; 359/391; 108/137; 108/143

(58) Field of Classification Search ............. 422/102; 359/391; 324/158.1; 73/7
See application file for complete search history.

(56) References Cited

U.S. PATENT DOCUMENTS

| | | | |
|---|---|---|---|
| 4,436,385 A | 3/1984 | Fischer et al. | |
| 5,873,566 A * | 2/1999 | Cadwallader et al. | 269/34 |
| 5,955,655 A * | 9/1999 | Evans | 73/7 |
| 6,005,386 A * | 12/1999 | Cadwallader et al. | 324/158.1 |
| 2004/0085629 A1* | 5/2004 | Zimmermann et al. | 359/391 |

FOREIGN PATENT DOCUMENTS

DE       202004007728 U1      7/2004

* cited by examiner

*Primary Examiner*—Walter D Griffin
*Assistant Examiner*—Christine T Mui
(74) *Attorney, Agent, or Firm*—Hodgson Russ LLP

(57) ABSTRACT

The invention relates to a specimen holder (10) for retaining specimens (9) for microscopic examination, which holder comprises two bars (3a, 3b) displaceable in opposite directions that are equipped on their mutually facing sides (7) with at least one respective recess (4a), in order to retain a specimen (9) by at least partial contact of those recesses against an outer edge of the specimen (9). It is proposed that the sides (7) of both bars (3, 3a, 3b) facing away from one another also be equipped with at least one respective recess (4b), so as thereby to increase the number of possibilities for specimen retention when both sides (7) of the bar (3a, 3b) are used by transposing the bars or by inserting them after a 180-degree rotation. It is further proposed to retain the bars (3a, 3b) magnetically on the specimen holder (10) so that the bars can easily be disassembled and reinserted following rotation.

18 Claims, 7 Drawing Sheets

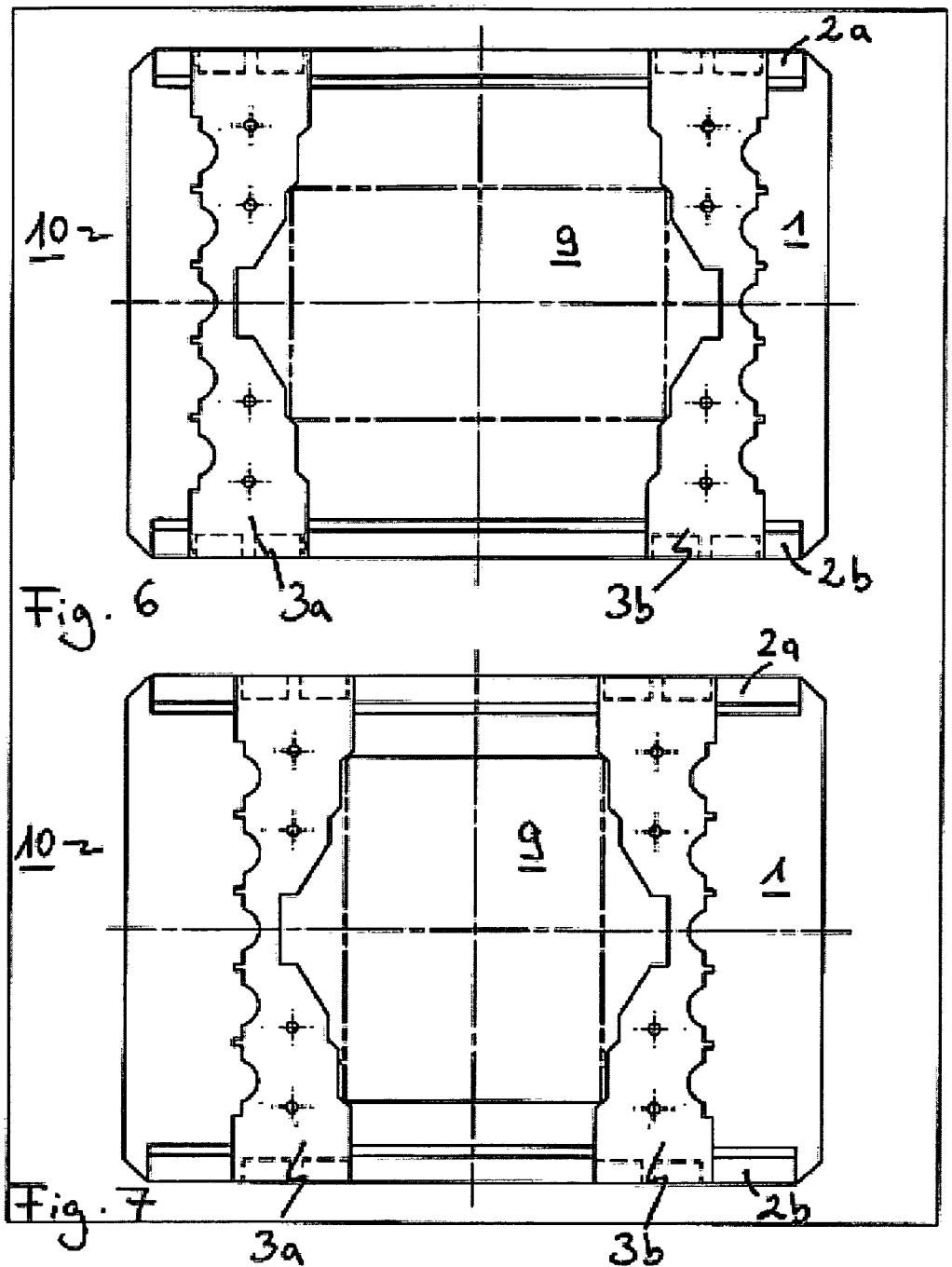

SPECIMEN HOLDER FOR MICROSCOPIC EXAMINATIONS

CROSS REFERENCE TO RELATED APPLICATIONS

This application claims priority of the German patent application 10 2005 009 756.1 filed Mar. 3, 2005, which is incorporated by reference herein.

FIELD OF THE INVENTION

The invention relates to a specimen holder for retaining specimens for microscopic examination, which holder comprises two bars displaceable in opposite directions that are equipped on their mutually facing sides with at least one respective recess, in order to retain a specimen by at least partial contact of those recesses against an outer edge of the specimen.

BACKGROUND OF THE INVENTION

Substantially two types of specimen receptacles are known for retaining specimens of different dimensions, for example on the specimen stage of a microscope, namely specimen clamps, which are mounted in the form of springs on the specimen stage and retain the specimen, usually a specimen carrier, on the stage. Also known is a specimen holder made up of two plates displaceable with respect to one another, according to DE 30 28 154 A1 (corresponding to U.S. Pat. No. 4,436,385). According to this document, two plates are mounted on the specimen holder, with the sides of these mutually facing plates movable toward and away from one another, i.e. displaceable in opposite directions. The mutually facing sides of the plates are equipped with indentations, so that an opening is created when the plates are slid toward one another. Each indentation additionally contains a setback onto which the specimen, for example a cylindrical or rectangular specimen carrier, can be placed. The specimen carrier is in turn held in the lateral direction by notches in the setbacks. Because the plates are braced against one another by frictional engagement with their guides or by spring force, the specimen is clamped in place with the aforesaid notches. Cylindrical specimens are in most cases retained using notches that extend tangentially to the outer specimen edge, while rectangular specimens are in most cases retained with notches that make contact against the corners of the specimen. The opening produced by the indentations in the plates is suitable, in particular for transmitted-light microscopes, for transilluminating the specimen. The specimen itself then lies on the setback at the edge of the two plates and is, as already discussed, retained laterally by means of the notches.

The aforesaid specimen holder according to DE 30 28 154 A1 has the disadvantage that the guiding and mutual clamping of the plates results in a complex design for the specimen holder, with which, furthermore, only a very limited number of specimens of different cross-sectional geometries can be retained. To allow the known specimen holders to be used for a larger number of specimen carriers, an exchange of plates having different notches would be necessary. This is complex, however, since for guidance and for mutual clamping the plates are captured in grooves that make disassembly considerably more difficult.

The aforementioned spring clamps are unsuitable for specimens such as Petri dishes, microtitration plates, or multi-well plates, since these specimens are too tall and their dimensions are too varied.

SUMMARY OF THE INVENTION

It is therefore the object of the present invention to describe a specimen holder as mentioned initially that permits more flexible handling and simplified manufacture, with the intention in particular of making it possible to retain a large number of specimens having different cross-sectional geometries.

In a first aspect of the invention, a specimen holder for retaining specimens for microscopic examination is proposed that comprises two bars displaceable in opposite directions that are equipped on the mutually facing sides with at least one respective recess in order to retain a specimen by at least partial contact of those recesses against an outer edge of the specimen, according to the present invention both bars additionally being equipped, on their two sides facing away from one another, with at least one respective recess. This creates the possibility of using both sides of the bars for retaining specimens, associated with which is a multiplication of the number of specimens of differing cross-sectional geometries that can be retained.

The two bars have, on both of their sides, prefabricated or specially fabricated recesses by means of which a specimen located between two mutually facing sides of the bars is retained. According to the present invention, each side of a bar can be used for specimen retention, so that the number of specimen shapes to be retained is immensely increased. For that purpose, the two sides of a bar comprise, in particular, different recesses, in which context multiple recesses can be present along the length of each side.

For easy manufacture of the bars and precise retention of the specimens, it is advantageous if the bars exhibit mirror symmetry with respect to a center line extending symmetrically between the mutually facing sides of the two bars. This feature is defined with reference to the location of the bars in the specimen holder. Rotating each bar 180 degrees about its longitudinal axis, or transposing the two bars and reinserting them into the specimen holder, causes two sides of the bars equipped with different recesses to face one another with mirror symmetry. As a rule (with no limitation as to generality), a bar is displaced in defined fashion on the specimen holder by means of a profiled rail (on the specimen holder) and a guide groove (on the upper and/or lower side of the bar). In order to retain the specimen, the two bars are displaced symmetrically with respect to the center line extending between the two bars. If the two bar sides are to be used for specimen retention according to the invention by rotating each bar 180 degrees about its longitudinal axis, guide grooves must be present on the bar on the upper and lower sides. As an alternative thereto, it would be possible to provide the guide groove on the upper or lower end face of a bar. When a bar is turned, indentations having the previously mentioned setbacks are also possible only if they are provided symmetrically on the upper and lower sides of the bar. The two bars can nevertheless be embodied identically if the upper and lower sides of a bar are configured symmetrically. If the two sides of the bars are to be used according to the present invention for retaining specimens, by the fact that the two bars are transposed with one another (without turning them) and reinserted into the specimen holder, the upper and lower sides of the bars can be different, in which case two different bars must then be used. Which of the two bar sides is to be used for retaining the specific specimen will be immediately apparent from the type of recesses on the bar sides.

It is particularly advantageous in the context of the present invention to use one of the narrower sides of a bar to guide it in the specimen holder, while the two long sides of a bar are equipped with the aforesaid recesses. This makes it possible to implement a great number of different recesses on one bar, so that the specimen holder according to the present invention is universally usable for a wide variety of specimen holders.

According to an advantageous embodiment, at least one profiled rail is provided along the displacement axis of the bars for guidance of each bar, the profile of the profiled rail coacting, for guidance of the bar, with a groove embodied in correspondingly complementary fashion on, in particular, the lower side of a bar. With this configuration, a single profiled rail can be provided for guidance of both bars. In this case the bars are embodied mirror-symmetrically with respect to one another, the mirror symmetry referring to a center line between the two facing sides of the bars. On the other hand, one profiled rail can be provided for guidance for each rail; for example, one bar is guided at its upper end and the other bar at its lower end, each along one profiled rail. Lastly, of course, two or more profiled rails can also be provided for guidance for each bar, which rails are in turn also utilized for guidance by the respective other bar. It is advisable, for accurate displacement of the bars with minimum play and thus for precise retention of the specimens, if the specimen holder comprises two profiled rails, each profiled rail guiding one bar in the displacement direction. Because it is usually desirable to retain the specimen at the center of the specimen holder, it is advisable once again to embody the bars mirror-symmetrically with respect to the center line between the two profiled rails (in other words, mirror-symmetrically with respect to the center vertical line that is perpendicular to the bar side equipped with the recesses). The previously mentioned advantage that two identically configured bars can be used thus also exists when two profiled rails are used, even when symmetry of the upper and lower sides of the bars is dispensed with.

To allow both sides of each bar to be used for retaining specimens, it must be possible to easily remove the bars from the specimen holder and reinsert them after transposition or rotation through 180 degrees. Depending on the aforementioned manner in which the bars are guided and on the configuration, governed thereby, of a bar, the aforesaid rotation of a bar through 180 degrees can be accomplished either as a rotation about its own longitudinal axis, so that the lower side of the bar becomes the upper side, or as a 180-degree rotation about the center point of the bar (in other words, as a 180-degree rotation about an axis perpendicular to the plane of the specimen holder or perpendicular to the longitudinal axis of the bar) so that the upper end of the bar (as viewed for example in FIG. 1) is rotated downward. For easy removal and reinsertion of the bars, it is useful if the bars rest on the aforesaid profiled rails and are held there by non-positive and/or positive engagement.

For example, the profile coacting with the profiled rail can be provided on the bar on its lower side, and can hold the bar releasably on the profiled rail by positive engagement. The specimen is retained by frictional forces (frictional engagement) occurring in the displacement direction.

It has proven particularly advantageous in this context if the non-positive engagement between the profiled rail and bar is effected by means of a magnetic force. The profiled rail can be manufactured for that purpose from magnetizable material, preferably steel, while a magnet is arranged in the region of the groove configured in complementary fashion on the bar. The effect of the magnetic non-positive engagement between the bar and profiled rail is that the bar can be releasably retained on the specimen holder. At the same time, precise guidance along the profiled rails is made possible.

It should be mentioned that in general, any magnetic releasable retention of the bars is advisable and advantageous for the present invention. If, for example, the bar is displaced on a plate of the specimen holder, the magnetically releasable retention of the bars can be effected in the following different ways. On the one hand, the magnetic force can be generated by an electromagnet, it being sufficient in this case if the magnetic field penetrates through the plate and the bar is fabricated, at least in the region of that magnetic field, from magnetizable material. On the other hand, the entire plate, or only the aforementioned profiled rails used for guidance, can also be fabricated from magnetic material. It would then be sufficient if the bars were manufactured at least partially, or at least in the region of the respective profiled rail, from magnetizable material. Lastly the possibility exists, as already mentioned, that the bar is fabricated entirely or partially from magnetic material, or contains a magnet, in which case the plate and/or profiled rails must then be magnetizable.

For configuration of the profiled rails, it is useful if they are embodied in an L-shape, the shorter limb of the L-shape engaging into a groove on the underside of the bar.

It is useful in general if the specimen holder has a scale or a marking capability along a profiled rail or adjacent thereto. This facilitates reproducible setting in the context of a sample change (in particular when the cross-sectional geometry of the specimen is the same). The marking capability can be a marking displaceable along the profiled rail. When the profiled rail is configured in an L-shape, the marking or scale can be mounted on the longer limb of the L-shape. When a sample is changed, the locations of the bars are marked or read off on the scale so that the specimen position can be returned to.

In another aspect of the invention, a specimen holder is proposed for retaining specimens for microscopic examination, which holder comprises two bars displaceable in opposite directions on a plate, such that a specimen is to be retained by at least partial contact of recesses, with which the two mutually facing sides of the bars are equipped, against an outer edge of the specimen; and such that according to the present invention the bars are retained on the plate in magnetically releasable fashion. Reference may be made to the statements made above regarding the various possibilities for magnetic releasable retention of the bars. Once again, the magnetic force can be generated by an electromagnet or by a magnetic material that is contained in the plate or in profiled rails located thereon. In this case the bar would be fabricated at least partly from magnetizable material in order to generate the magnetic attractive force. On the other hand, it is possible and easily achievable to fabricate the bar at least partly from magnetic material or to introduce a magnet onto or into the bar. In this case it is useful if a magnetizable material that, together with the magnet present in or on the bar, constitutes a releasable retention of the bar is provided along the displacement axis of a bar on the plate of the specimen holder.

Magnetic retention of the bars in the specimen holder, according to the second aspect of the invention, permits releasable retention with a capability for accurate adjustment of the bars, and thus permits more flexible handling and simplified manufacture as compared with specimen holders known hitherto. The capability thereby brought about for easy disassembly of the bars is advantageous in particular when this aspect of the invention is combined with the aforesaid first aspect of the invention. By transposition of the bars or by insertion thereof after 180-degree rotation, it is then possible to combine both sides of each of the bars with one another. Assembly and disassembly are easy to accomplish by way of the magnetic coupling according to the present invention.

Be it noted expressly at this juncture that the invention according to the first aspect and all the embodiments of this invention can be combined with the invention according to the second aspect, and vice versa.

In particular, it is advantageous if the magnetizable material is embodied as a profiled rail that, together with a groove embodied in correspondingly complementary fashion on a bar, constitutes a guide for that bar. The profiled rail can be mounted in non-positively or directly engaged fashion on a baseplate of the specimen holder. Each bar can use one or more profiled rails for guidance. One or more profiled rails can also be used in shared fashion by both bars. The magnetic coupling of the bar with a profiled rail on the specimen holder creates a non-positive engagement that allows precise displacement of the bar along the profiled rail and releasable retention of the bar on the profiled rail.

In the context of the second aspect of the invention as well, it is once again desirable if the profiled rail is embodied in an L-shape, the shorter limb engaging into a groove on the lower side of the bar. The specimen holder can again comprise a scale or a marking capability along a profiled rail or adjacent thereto. What was stated in connection with the first aspect of the invention is applicable with regard to these features.

It is particularly useful if each bar is or can be equipped, on its two sides facing away from one another, with at least one respective recess. Be it expressly noted in this connection that the second aspect of the invention has as its subject matter specimen holders having bars that need not necessarily be equipped from the outset with recesses. Simply for retention of a specimen, it is necessary for the functionality of the specimen holder that recesses be introduced into one or both sides of a bar. These recesses can be incorporated into the bar sides from the outset in standard fashion, but it is likewise possible to leave it to the user to configure customer-specific recesses.

As already discussed in connection with the first aspect of the invention, it is desirable if each of the two sides of a bar comprises recesses that differ from one another, so that both sides of a bar can be used for specimen retention by combining them with the respectively corresponding side of the other bar.

BRIEF DESCRIPTION OF THE DRAWINGS

The two aspects of the invention and their advantages will be explained in more detail below in the exemplifying embodiments that follow, illustrated in the attached drawings, wherein FIG. 1 schematically shows a specimen holder according to the present invention in use, with five retained rectangular specimen carriers;

FIGS. 6 and 7 show a specimen holder according to the present invention with a multi-well plate retained in different positions;

DETAILED DESCRIPTION OF THE INVENTION

Figure 1:
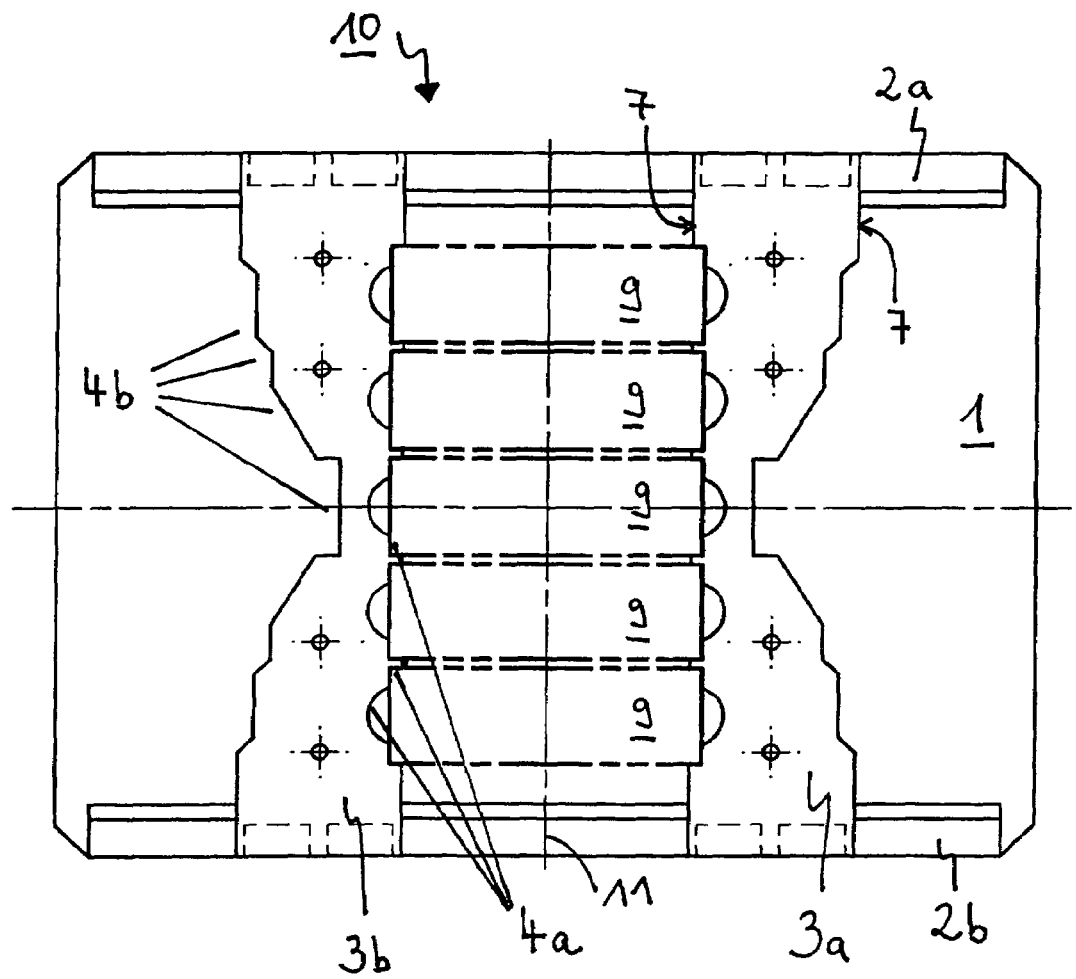

Specimen holder 10 according to the present invention as shown in FIG. 1 substantially comprises a plate 1 on whose longitudinal or transverse sides two profiled rails 2a and 2b are mounted in non-positively or directly engaged fashion, and two bars 3a and 3b. Plate 1 has the function of a stage plate of the microscope. It is either transparent (made suitably of glass or plastic) for transmitted-light microscopes, or not transparent (made suitably of plastic or metal, preferably black-anodized aluminum) for incident-light microscopes. Plate 1 can have, as in the embodiment of DE 30 28 154 A1 discussed above, a hole at its center so as thereby to transilluminate specimens or specimen carriers. The stage plate can be stationary or can be a constituent of a cross-slide plate (not depicted) known per se. In this exemplifying embodiment (and in accordance with the second aspect of the invention) profiled rails 2a and 2b are manufactured from magnetizable material, preferably from steel. Bars 3a, 3b have on their underside at one end a respective groove for guidance of bar 3a, 3b along profiled rails 2a and 2b, respectively. At least one of their ends, bars 3a, 3b have a respective magnet 6 (cf. FIG. 2) that forms a non-positive engagement together with the profiled rails and releasably retains bar 3a, 3b on plate 1. As already mentioned, the two bars 3a and 3b can also use only a single profiled rail for shared guidance, or they can each use both profiled rails for guidance. In this exemplifying embodiment (cf. in particular FIGS. 2A-2C) each of bars 3a and 3b uses one respective profiled rail 2a, 2b for guidance.

The cross sections of profiled rails 2a and 2b are symmetrical. The profiled rails need not be in one piece; they can also be implemented only in segments (to the extent necessary for guidance).

The embodiment according to FIG. 1 has the advantage that, because of the symmetrical arrangement, two identical bars 3a and 3b can be used. This simplifies manufacture and decreases costs. In their arrangement on the specimen holder, recesses 4a and 4b on the two bars 3a and 3b exhibit mirror symmetry with respect to center lines 11 and 12.

For the retention of specimens 9 (in this case five identical standard rectangular specimen carriers), bar 3a and second bar 3b are guided on profiled rails 2a and 2b and their spacing is adjusted. Recesses 4a on the mutually facing sides 7 of the two bars 3a and 3b have small rectangular recesses that enclose the corners of specimen carriers 9 in order to retain those specimen carriers. Because the entirety of longitudinal sides 7 of bars 3a and 3b can be used, it is possible to equip one side 7 with repeating shapes of recesses 4a (and 4b) so that multiple specimen carriers 9 can be retained using one specimen holder.

Figure 2B:
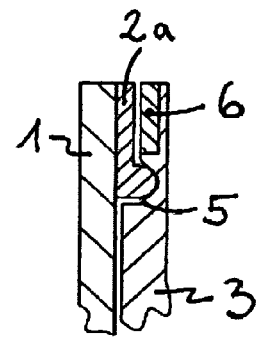
FIG. 2B is an enlargement of a region at an upper end of the bar as shown in the cross-sectional view of FIG. 2A.
Figure 2A:
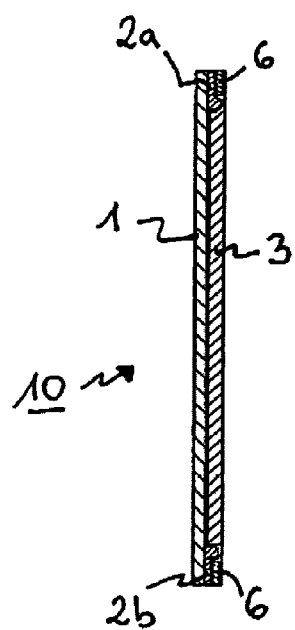
FIG. 2A is a schematic cross-section through the specimen holder and a bar thereof shown in FIG. 1, perpendicular to the plane of the drawing.
Figure 2C:
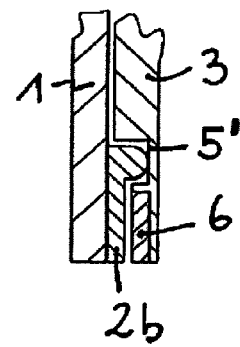
FIG. 2C is an enlargement of a region at a lower end of the bar as shown in the cross-sectional view of FIG. 2A.

FIG. 2A is a cross section, perpendicular to the drawing plane of FIG. 1, through a specimen holder 10 having a bar 3 (3a or 3b); FIG. 2A depicts the entire section, while FIGS. 2B and 2C respectively depict the upper and lower ends in enlarged views. FIG. 2A shows plate 1 of specimen holder 10 with profiled rails 2a and 2b mounted thereon in directly or non-positively engaged fashion, as well as bar 3 resting thereon. At the upper and the lower end of bar 3, a respective magnet 6 is mounted in the region above or alongside profiled rails 2a and 2b. FIGS. 2B and 2C show the relationships in the region of profiled rails 2a and 2b in enlarged views. Profiled rail 2a is embodied in an L-shape, the shorter limb engaging into a groove 5 of a bar 3 and thereby forming a guidance system for bar 3 along profiled rail 2a. A magnet 6 is arranged in the region of groove 5, in this exemplifying embodiment on the underside of bar 3. As shown in FIG. 2B, groove 5 is embodied as a V-groove, corresponding to the profile of profiled rail 2a engaging into bar 3. If guidance is to occur along both profiled rails 2a and 2b, it is advisable also to configure the profile of groove 5' (shown as a simple rectangular cut-out in FIG. 2C) correspondingly in the underside of bar 3. FIG. 2C shows the case of a rectangular cutout 5' that serves to support the unguided side, so that the actual guidance of bar 3 is accomplished only by way of upper groove 5 and upper profiled rail 2a. If bar 3 is inserted after being rotated 180 degrees, guidance is accomplished by way of said groove 5 and profiled rail 2b. Be it noted that identical bars 3a and 3b can be used with this design as well (cf. FIG. 1), bar 3a then being guided by profiled rail 2a, and bar 3b by profiled rail 2b.

Be it furthermore noted once again that situations are conceivable in which it may be desirable to implement the magnetic coupling by way of a magnetic profiled rail, in which case bar 3 would then need to contain, instead of a magnet 6, merely a magnetizable material, or would need to be manufactured from such material.

In this and the following exemplifying embodiments, plate 1 of specimen holder 10 is depicted without a central opening (hole). This is not, however, intended to exclude the possibility of providing such an opening in plate 1. Furthermore, sides 7 of bars 3a and 3b are correspondingly embodied without indentations and setbacks as depicted in DE 30 28 154 A1 (U.S. Pat. No. 4,436,385) that has already been mentioned. Such indentations and setbacks can, of course, be provided in the present exemplifying embodiments as necessary. Such indentations in bar sides 7 would then have the purpose of not covering the central opening in plate 1, while the setbacks in bar sides 7 would serve to allow placement onto the setback of a specimen that is then retained laterally by the recesses along bar sides 7.

Figure 3:
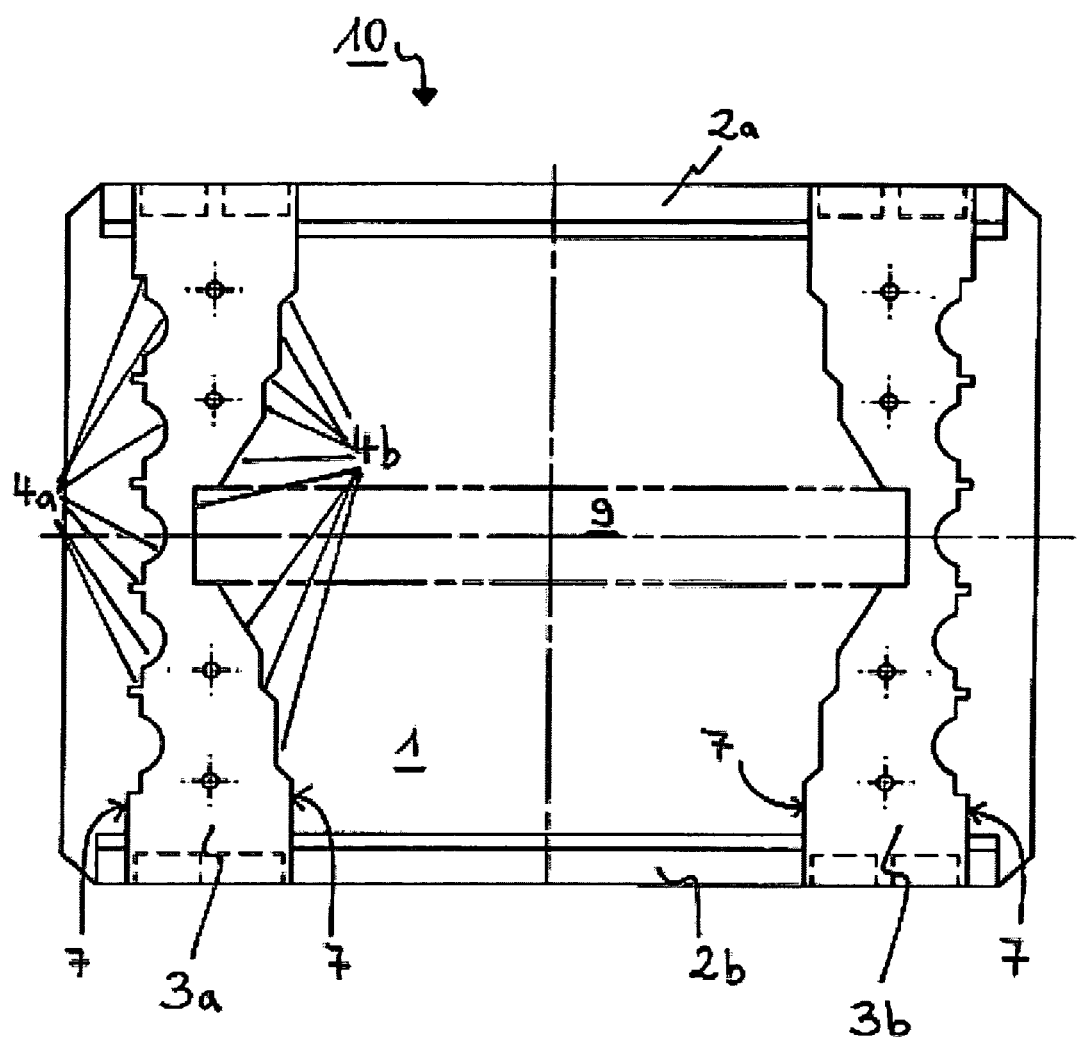
FIG. 3 shows a specimen holder according to the present invention with a retained rectangular specimen carrier.

FIG. 3 shows a specimen holder 10 as depicted in FIG. 1, bars 3a and 3b here being inserted after being rotated 180 degrees and transposed with one another. Recesses 4b now correspondingly serve for the retention of specimens. The possibility, according to the present invention, of combining recesses 4a and 4b on both sides 7 of a bar 3a with the corresponding recesses on one side 7 of bar 3b enhances the universality of the specimen receptacle.

Figure 4:
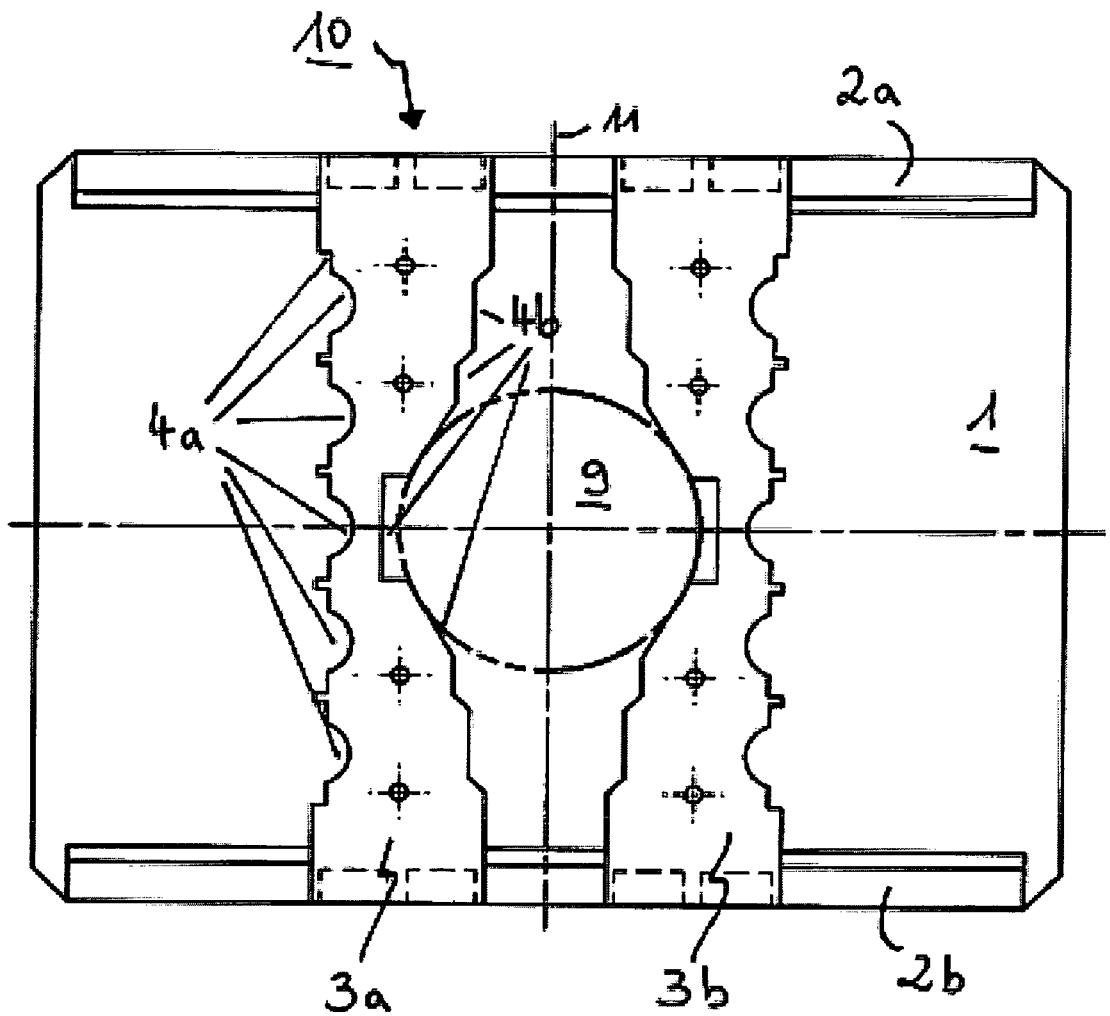
FIG. 4 shows a specimen holder according to the present invention with a retained cylindrical specimen carrier.
Figure 5:
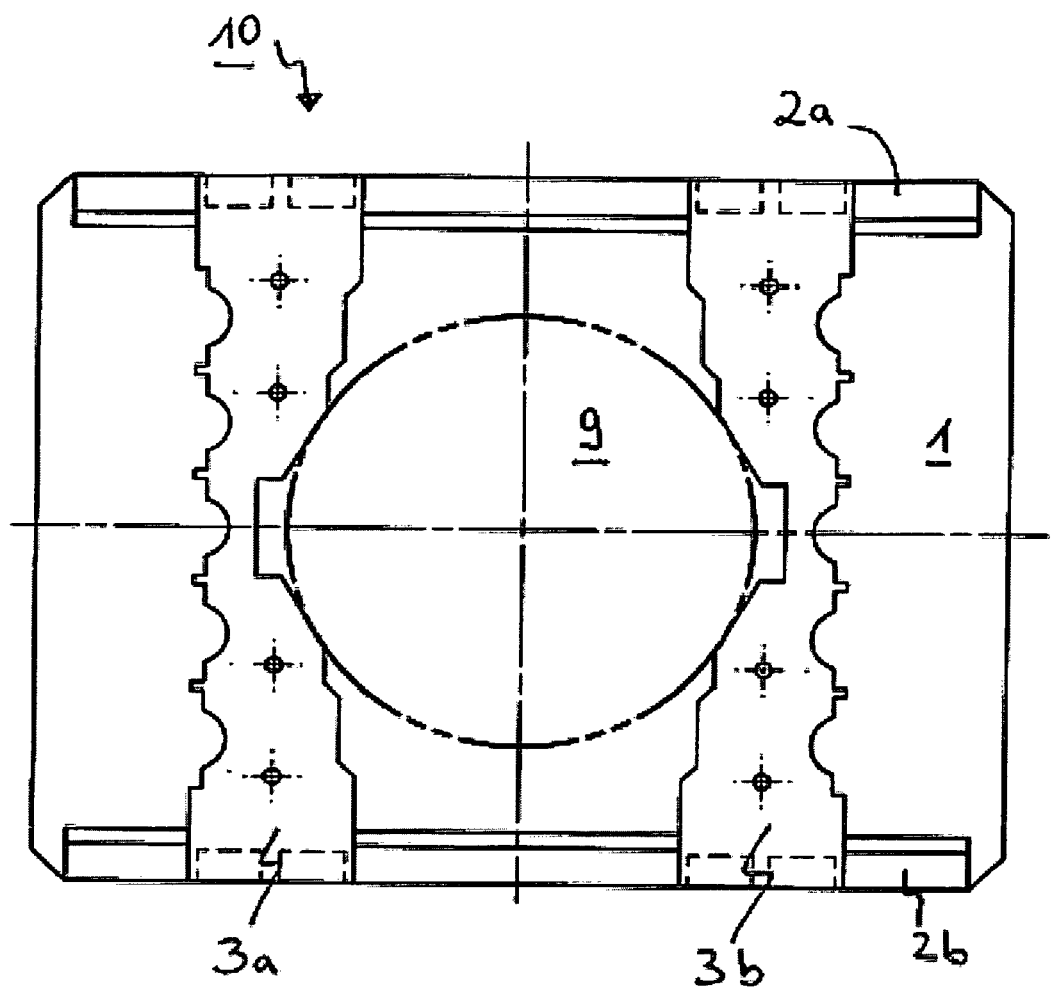
FIG. 5 shows a specimen holder according to the present invention with a further retained cylindrical specimen carrier.

FIG. 3 shows an arrangement for very long rectangular specimen carriers 9, while FIG. 4, with the same orientation of bars 3a and 3b, shows retention for specimens that are circular in cross section. FIGS. 4 and 5 show retention for Petri dishes or other cylindrical specimen carriers of various diameters. As is apparent from FIGS. 4 and 5, recesses 4b serving for retention extend tangentially along the outer edge of specimen 9. This recess shape has the advantage, in contrast to a circular recess, that specimens having different (circular) diameters can be retained.

FIGS. 6 and 7 show, once again with bars 3a and 3b in the same orientation, the reception and retention of microtitration plates or "multi-well" plates in two orientations rotated 90 degrees with respect to one another. Multi-well plates of this kind are suitable for receiving a plurality of specimen carriers that are circular in cross section. For example, 12×8=96 such individual specimen carriers can be present in one such plate.

Figure 8:
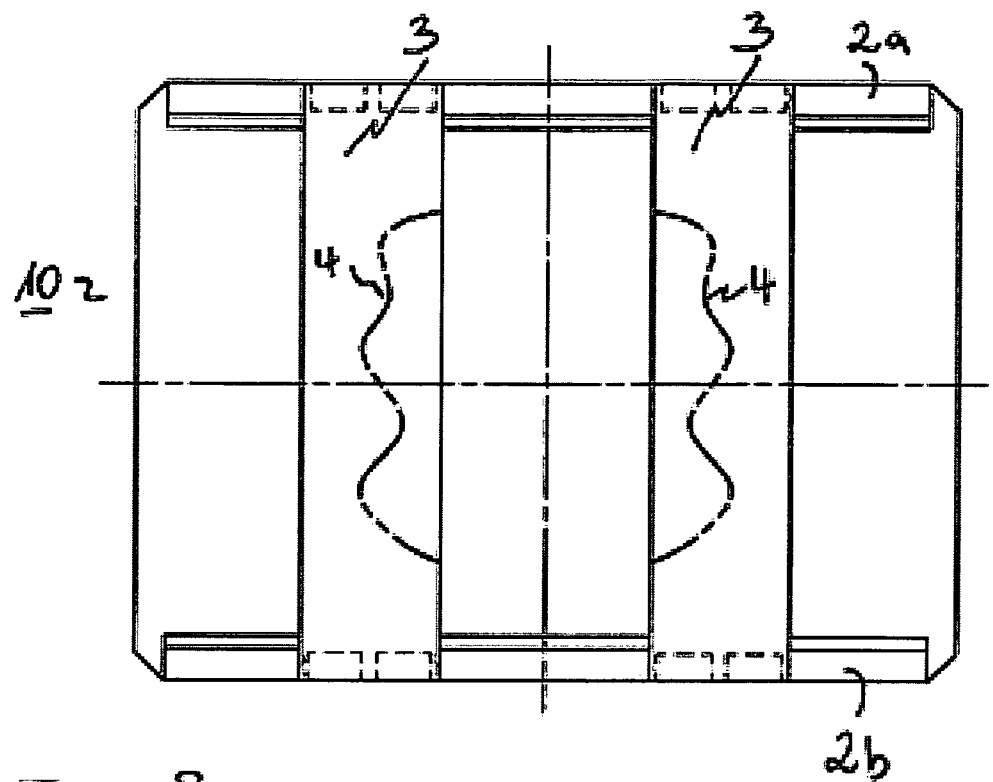
FIG. 8 shows a specimen holder with bars having no prefabricated recesses, wherein custom recesses are provided by the end user.

In a further embodiment that is schematically depicted in FIG. 8, bars 3 have no recesses and allow the user to produce customer-specific recesses. Such customer-specific recesses 4 are indicated in bars 3 of FIG. 8. An embodiment of this kind corresponds in particular to the second aspect of the invention which refers to magnetic coupling of the bars, although it is not necessary for both sides of a bar to be equipped with recesses. Here as well, however, it should be emphasized that all the embodiments depicted here in accordance with FIGS. 1 to 9 apply in principle to both aspects of the invention, provided nothing is explicitly stated to the contrary.

Figure 9:
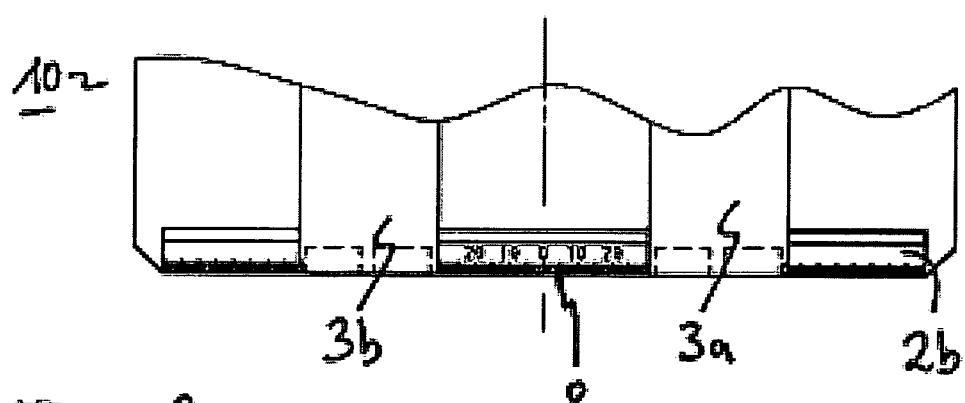
FIG. 9 shows the lower part of a specimen holder according to the present invention with a scale for detecting the bar positions.

Lastly, FIG. 9 schematically shows a lower portion of a specimen holder 10 according to the present invention with a scale 8 that allows the position of bars 3a and 3b to be precisely determined, in order to facilitate reproducible setting in the context of a sample change (change of specimen or specimen carrier 9). In the exemplifying embodiment according to FIG. 9, scale 8 is mounted on the longer limb of the L-shaped profiled rail 2b. Bars 3a and 3b cover the scale, so that the position can be read off at the right or left edge of a bar 3a, 3b by way of scale 8, and can serve for orientation.

In general, in the context of specimen holder 10 according to the present invention for retaining a specimen 9 for microscopic examination, that specimen 9 is placed onto plate 1, and bars 3a and 3b are oriented so that suitable recesses 4a or 4b face toward the specimen, bars 3a and 3b being placed onto profiled rails 2a, 2b and then brought together until the corresponding recesses are at least partially in contact against the outer edge of specimen 9 in order to retain that specimen. The magnetic coupling of bars 3a and 3b with profiled rails 2a and 2b results in retention of the specimen.

The magnetic coupling (magnetic force between bars and profiled rails or more generally between the bars and the actual specimen holder or the baseplate of the specimen holder) serves to retain the bars and permits easy mounting, removal, and orientation of those bars. At the same time, the magnetic force allows retention of a specimen that is located between the two bars. This aspect of the invention makes it easy to utilize both sides of a bar 3 and thus to increase the number of recesses, which enhances flexibility in terms of specimen retention. This aspect—the possibility of using both sides—is independently claimed in the present Application. In global terms, the specimen holder according to the present invention also makes possible customer-specific solutions, since it is not necessary to install multi-part guidance systems. Instead, all that is needed for the specimen holder according to the present invention is essentially two profiled rails and two (advantageously, identically configured) bars.

PARTS LIST

1 Plate
2, 2a, 2b Profiled rail
3, 3a, 3b Bar
4, 4a, 4b Recesses on one bar side
5 Groove in a bar
5' Recess in a bar
6 Magnet
7 Side of a bar
8 Scale
9 Specimen, specimen carrier
10 Specimen holder
11 Center line (between two bars)
12 Center line (perpendicular to bar sides)

What is claimed is:

1. A specimen holder for retaining specimens for microscopic examination, the specimen holder comprising:
two bars arranged opposite one another and displaceable in opposite directions along a displacement axis, each of the two bars respectively including a first side and a second side, the respective first sides facing one another and the respective second sides facing away from one another;

at least one rail extending along the displacement axis for guiding the two bars, each of the two bars having a groove profiled to fit with a corresponding rail;

wherein the at least one rail has an L-shaped profile, a shorter limb thereof engaging into the groove of the bar or bars guided thereby;

wherein the first sides each have at least one respective recess therein for retaining a specimen by at least partial contact of the respective recesses against an outer surface of the specimen;

wherein the two bars can be removed from the specimen holder and reinserted in the specimen holder after rotation of each bar 180 degrees about its longitudinal axis, or after transposing the two bars; and wherein the second sides also each have at least one respective recess therein for retaining a specimen by at least partial contact of the respective recesses against an outer surface of the specimen after removing and reinserting the two bars including said rotation or said transposition.

2. The specimen holder according to claim 1, wherein the recesses of the first sides of the two bars are different from the recesses of the second sides of the two bars.

3. The specimen holder according to claim 1, wherein the recesses of the first sides of the two bars exhibit mirror symmetry with respect to a center line extending between the first sides, and the recesses of the second sides of the two bars exhibit mirror symmetry with respect to the center line.

4. The specimen holder according to claim 1, wherein the two bars are guided by a single rail.

5. The specimen holder according to claim 1, wherein each of the two bars is guided by a different rail.

6. The specimen holder according to claim 5, wherein the two bars are identical.

7. The specimen holder according to claim 1, further comprising a plate on which the two bars are retained in magnetically releasable fashion.

8. The specimen holder according to claim 1, wherein the at least one rail includes a rail fabricated from a magnetizable material, and the two bars include a bar fabricated, at least in the region of its groove, from a magnetizable material, wherein the rail fabricated from a magnetizable material guides the bar fabricated at least in the region of its groove from a magnetizable material.

9. The specimen holder according to claim 1, wherein the at least one rail includes a rail fabricated from a magnetizable material, and the two bars include a bar that contains, at least in the region of its groove, a magnetic material or a magnet, wherein the rail fabricated from a magnetizable material guides the bar that contains a magnet or a magnetic material.

10. The specimen holder according to claim 1, wherein the at least one respective recess in each of the first sides comprises a plurality of recesses to allow specimens of different cross-sectional geometries to be retained.

11. The specimen holder according to claim 10, wherein the at least one respective recess in each of the second sides comprises a plurality of recesses to allow specimens of different cross-sectional geometries to be retained.

12. The specimen holder according to claim 1, further comprising a scale along the displacement axis.

13. A specimen holder for retaining specimens for microscopic examination, the specimen holder comprising:
a plate;
two bars arranged opposite one another and displaceable in opposite directions along a displacement axis relative to the plate, each of the two bars respectively including a first side and a second side, the respective first sides facing one another and the respective second sides facing away from one another;
wherein the first sides each have at least one respective recess therein for retaining a specimen by at least partial contact of the respective recesses against an outer surface of the specimen;
wherein the two bars are retained on the plate by magnetic force;
wherein the plate includes a magnetizable material along the displacement axis and each of the two bars includes a magnet to provide the magnetic force retaining the two bars;
wherein the plate includes at least one rail extending along the displacement axis for guiding the two bars, each of the two bars having a groove profiled to fit with a corresponding rail, wherein the magnetizable material is included in the at least one rail; and
wherein the at least one rail has an L-shaped profile, a shorter limb thereof engaging into the groove of the bar or bars guided thereby.

14. The specimen holder according to claim 13, further comprising a scale along the displacement axis.

15. The specimen holder according to claim 13, wherein the second sides also each have at least one respective recess therein for retaining a specimen by at least partial contact of the respective recesses against an outer surface of the specimen.

16. The specimen holder according to claim 15, wherein the recesses of the first sides of the two bars are different from the recesses of the second sides of the two bars.

17. The specimen holder according to claim 13, wherein the two bars are guided by a single rail.

18. The specimen holder according to claim 13, wherein each of the two bars is guided by a different rail and the two bars are identical.

* * * * *